United States Patent Office 2,712,493
Patented July 5, 1955

2,712,493

MANUFACTURE OF CYANOGEN

William Mojé, Niagara Falls, N. Y., assignor to E. I. du Pont de Nemours and Company, Wilmington, Del., a corporation of Delaware No Drawing. Application March 17, 1953, Serial No. 342,990

10 Claims. (Cl. 23—151)

This invention relates to the manufacture of cyanogen and more particularly to the manufacture of cyanogen by the vapor-phase oxidation of hydrogen cyanide.

It has been discovered that if a mixture of air and hydrogen cyanide be contacted with certain catalysts at an elevated temperature, cyanogen gas can be obtained in relatively good yield. An over-all equation for the reaction occurring may be written as:

$$\tfrac{1}{2}O_2 + 2HCN \rightarrow (CN)_2 + H_2O$$

but no conclusions as to the possible mechanism of the reaction should be drawn from this simple equation.

The synthesis is carried out by passing a mixture of hydrogen cyanide and air containing somewhat more than the stoichiometric quantity of oxygen over silver deposited on an inert porous base. Suitable catalysts may be prepared by impregnating such a base with a thermally unstable silver compound such as, for example, silver ammonium nitrate and heating the impregnated base or treating it with a chemical reducing agent. This procedure yields a porous carrier coated with not more than about 10% of its weight of finely divided silver particles.

The carrier itself may consist of about any inert porous material to which finely divided silver will adhere. Preferred carriers are pumice, kieselguhr and "Alfrax," a commercial form of alumina. A less preferred but usable carrier is silica gel. This last-mentioned material exposes a larger surface area than do the others and promotes the formation of ammonia at the expense of the desired cyanogen.

In all cases a temperature between 300° and 600° C. is employed to carry out the reaction between oxygen and the hydrogen cyanide.

The apparatus required for the conversions is conventional and may consist, for example, of a reactor made of Pyrex tubing mounted vertically in a furnace. The particular catalyst used may be supported by any convenient means in the reactor.

In practice air-hydrogen cyanide mixtures were formed by bubbling air through liquid hydrogen cyanide held at 0° C. and introduced into the top of the vertical reactor. The mixtures were then passed downwardly through the catalyst, held at the desired temperature, and thence through a collection train comprising in series sulfuric acid to remove ammonia, silver nitrate to remove unreacted hydrogen cyanide and sodium hydroxide to remove cyanogen. The spent gases were finally vented into the atmosphere. The cyanogen produced was determined by conventional titration with silver nitrate. Qualitative determinations were made by the method of Feigl et al., Anal. Chim. Acta, 3, 300 (1940), using palladium dimethylglyoximate.

Further details of the invention will be evident from the examples which follow:

EXAMPLE 1

Several runs were made passing a mixture of hydrogen cyanide and air through 20 cc. of a catalyst consisting of finely divided silver on "Alfrax" (alumina). The mole ratio of air to hydrogen cyanide in the mixture, prepared as described above, was 1.87:1 and contained a 57% excess of oxygen. Other conditions and results are shown in Table I.

Table I.—Silver-on-"Alfrax" catalyst

| Run | Catalyst, cc. | Space Velocity, l. gas/l. cat./hr. | Furnace Setting, °C. | Max. Temp. Measured (Hot Spot), °C. | Reaction Time, Min. | Yield, Percent (CN)$_2$ |
|---|---|---|---|---|---|---|
| 1 | 30 | 332 | 375 | 475 | 12 | 5.3 |
| 2 | 30 | 240 | 400 | 500 | 10 | 4.3 |
| 3 | 20 | 773 | 460 | 600 | 2 | 11.3 |
| 4 | 10 | 995 | 500 | 550 | 5 | 13.5 |
| 5 | Reused* | 1,546 | 500 | 600 | 5 | 13.0 |
| 6 | 10 | 995 | 450 | 500 | 6.5 | 8.2 |

*The catalyst of the previous run was reused in run 5.

EXAMPLE 2

The procedure of Example 1 was substantially repeated except that silver-on-pumice was substituted for silver-on-alumina. Other operating conditions and results are tabulated in Table II.

Table II.—Silver-on-pumice catalyst

| Run | Catalyst, cc. | Space Velocity | Furnace Setting, °C. | Hot Spot Temp., °C. | Reaction Time, Min. | Yield, Percent (CN)$_2$ |
|---|---|---|---|---|---|---|
| 7 | 10 | 995 | 475 | 525 | 5 | 17.5 |
| 8 | Reused* | 1,050 | 500 | 550–575 | 3 | 22.8 |
| 9 | do | 884 | 500 | 550–575 | 1 | 14.7 |

*Runs 8 and 9 reused the catalyst of the previous run.

EXAMPLE 3

The procedure of the previous examples was repeated except that 20 cc. samples of silver-on-silica gel and silver-on-kieselguhr were substituted for the "Alfrax" and pumice supported catalysts. Qualitative measurements showed that cyanogen again was produced from the hydrogen cyanide.

Several modifications in the process shown above will be evident to those skilled in the art. The cyanogen, for instance, need not be separated from hydrogen cyanide by the expensive process utilizing silver nitrate described. Hydrogen cyanide can alternatively be first condensed from the gases at around 25–26° C. and cyanogen then separated out by cooling the remaining gases to about −20.5° C., the boiling point of cyanogen. A conventional series of cooling traps can effectuate this separation.

The carrier, furthermore, need not be any of those enumerated. Any porous material inert to the gases and at the temperatures employed can be substituted for those exemplified. In like manner, the quantity of silver spread over the carrier is not particularly critical. Percentages of between about 1 and up to 10% of the weight of the carrier are effective. Even higher percentages can be utilized but are uneconomic. A deposit comprising 1–2% by weight of the catalyst is effective and because it utilizes less of the expensive metal is preferred. On the other hand silver gauze can be utilized if desired.

Space velocities are not particularly critical, values ranging from about 250 to 1500 liters of gas per liter of catalyst per hour being acceptable. Best results, however, are obtained with space velocities of from about 750 to 1500 l./l./min. Relatively short contact periods of 1–5 minutes are preferred although longer periods can be tolerated.

It is evident that other oxygen containing gases can be substituted for air, oxygen itself, for example. In fact, any gas containing free oxygen and inert materials only is usable. The quantity of oxygen employed is likewise not critical although at least stoichiometric amounts are necessary for complete reaction.

Having now described my invention,

I claim:

1. The method of preparing cyanogen which comprises reacting hydrogen cyanide with at least the stoichiometric quantity of air in the presence of a metallic silver catalyst and at a temperature of about 300–600° C. and subsequently separating cyanogen from the resultant gases.

2. The method of claim 1 in which the catalyst is metallic silver.

3. The method of claim 2 in which the catalyst is silver gauze.

4. The method of claim 2 in which the catalyst is finely divided silver supported on an inert carrier.

5. The method of claim 4 in which the carrier is alumina.

6. The method of claim 4 in which the carrier is pumice.

7. The method of claim 4 in which the carrier is kieselguhr.

8. The method of claim 4 in which the carrier is silica.

9. The process which comprises reacting gaseous hydrogen cyanide with a gas containing free oxygen at an elevated temperature and in the presence of a metallic silver catalyst and subsequently separating cyanogen from the resultant gases.

10. The process of claim 1 in which cyanogen is removed from the resultant gases by condensation.

References Cited in the file of this patent

UNITED STATES PATENTS 1,934,838   Andrussow _____ Nov. 14, 1933